United States Patent
Sprigg et al.

(10) Patent No.: US 7,165,099 B2
(45) Date of Patent: Jan. 16, 2007

(54) DYNAMICALLY DOWNLOADING AND EXECUTING SYSTEM SERVICES ON A WIRELESS DEVICE

(75) Inventors: Stephen A. Sprigg, Poway, CA (US); Brian Minear, San Diego, CA (US); Mahesh Moorthy, San Diego, CA (US); Paul E. Jacobs, La Jolla, CA (US)

(73) Assignee: Qualcomm Inc., San Diego, CA (US)

( * ) Notice: Subject to any disclaimer, the term of this patent is extended or adjusted under 35 U.S.C. 154(b) by 825 days.

(21) Appl. No.: 10/099,100

(22) Filed: Mar. 15, 2002

(65) Prior Publication Data

US 2004/0203690 A1    Oct. 14, 2004

(51) Int. Cl.
*G06F 13/00* (2006.01)
(52) U.S. Cl. ............... 709/219; 709/201; 719/329
(58) Field of Classification Search ........... 709/217, 709/219; 719/328, 329
See application file for complete search history.

(56) References Cited

U.S. PATENT DOCUMENTS

| | | | |
|---|---|---|---|
| 6,295,645 B1 * | 9/2001 | Brewer | 717/178 |
| 2001/0003824 A1 * | 6/2001 | Schnier | 709/203 |
| 2002/0026474 A1 * | 2/2002 | Wang et al. | 709/203 |
| 2002/0069263 A1 * | 6/2002 | Sears et al. | 709/218 |
| 2002/0112078 A1 * | 8/2002 | Yach | 709/246 |
| 2002/0129129 A1 * | 9/2002 | Bloch et al. | 709/220 |
| 2002/0147812 A1 * | 10/2002 | Schoetlger | 709/225 |
| 2002/0156926 A1 * | 10/2002 | Batke et al. | 709/250 |
| 2002/0188935 A1 * | 12/2002 | Hertling et al. | 717/170 |
| 2003/0009488 A1 * | 1/2003 | Hart, III | 707/500 |
| 2003/0033443 A1 * | 2/2003 | Igotti | 709/328 |
| 2003/0079052 A1 * | 4/2003 | Kushnirskiy | 709/328 |
| 2003/0093508 A1 * | 5/2003 | Li et al. | 709/222 |

FOREIGN PATENT DOCUMENTS

| | | |
|---|---|---|
| EP | 0718761 | 12/1995 |
| EP | 0945792 | 3/1999 |
| EP | 1049005 | 4/2000 |

* cited by examiner

*Primary Examiner*—Viet D. Vu
(74) *Attorney, Agent, or Firm*—Philip R. Wadsworth; Robert J. O'Connell

(57) ABSTRACT

An applet requiring a virtual machine is downloaded to a wireless device. A software platform on the device determines that a virtual machine is used by the applet during execution. Without additional user interaction, the virtual machine is downloaded to the wireless device. This allows those applets requiring a virtual machine to be used with devices that don't have the virtual machine already installed. Further embodiments include the dynamic loading of a system service when an application is being loaded that uses the system service. A unique identifier associated with the system service may be used to determine if determine if the system service is loaded.

4 Claims, 3 Drawing Sheets

DYNAMICALLY DOWNLOADING AND EXECUTING SYSTEM SERVICES ON A WIRELESS DEVICE

BACKGROUND

Typically, system services, including virtual machines, viewers and plug-ins, need to be installed on a device in order to be used by other objects or applications that require them. For example, Java applets run on a device that has a Java virtual machine loaded. Consequently, a device that intends to execute the Java applet will install the Java virtual machine on the device. Typically, because the virtual machine, or other system service, needs to be integrated into the device it is executing on, the installation is performed in advance of trying to download or execute applet or other application wanting to take advantage of the system service.

Some devices, particularly wireless devices, however, have a constrained environment. Memory, including secondary storage and primary for active programs and data, and processing is more scarce than on other larger computer systems. Consequently, it is advantageous to only download or install some system services, such as virtual machines, on an as needed basis. Unfortunately, on these constrained devices, system services are required to be installed or loaded into memory and take up valuable resources even when not used. Furthermore, users who want to use applications on devices that do not already have the application's supporting system services are hampered or prevented from doing so because the system services were not already installed on the device.

SUMMARY OF THE INVENTION

The present invention satisfies the shortcomings in the art by providing a system and method for dynamically downloading and installing system services, such as virtual machines, viewers, plug-ins, flash-players, other executable content or data, in a device based on the needs of the application running on the device.

In one embodiment, the present invention involves downloading a system service onto a wireless device to be used with an application also being downloaded. The system service may be downloaded automatically when the application is downloaded without user intervention.

In yet another embodiment, the present invention also detects whether a virtual machine is present when an application is loaded into the device's memory for execution and loads and executes the virtual machine, if necessary, so the application may run in the virtual machine's environment.

BRIEF DESCRIPTION OF THE DRAWINGS

Reference will now be made in detail to the presently exemplary and preferred embodiments of the invention as illustrated in the accompanying drawings, in which like reference characters designate like or corresponding parts throughout the several drawings. The nature, objectives and advantages of the present invention will become more apparent to those skilled in the art after considering the following detailed description in connection with the accompanying drawings.

The accompanying drawings, which are incorporated in and constitute a part of the specification, illustrate presently preferred embodiments of the invention and, together with the general description given above and the detailed description of the preferred embodiments given below, serve to explain the principles of the invention. In the drawings.

DESCRIPTION OF AN EXEMPLARY EMBODIMENT

Figure 1:
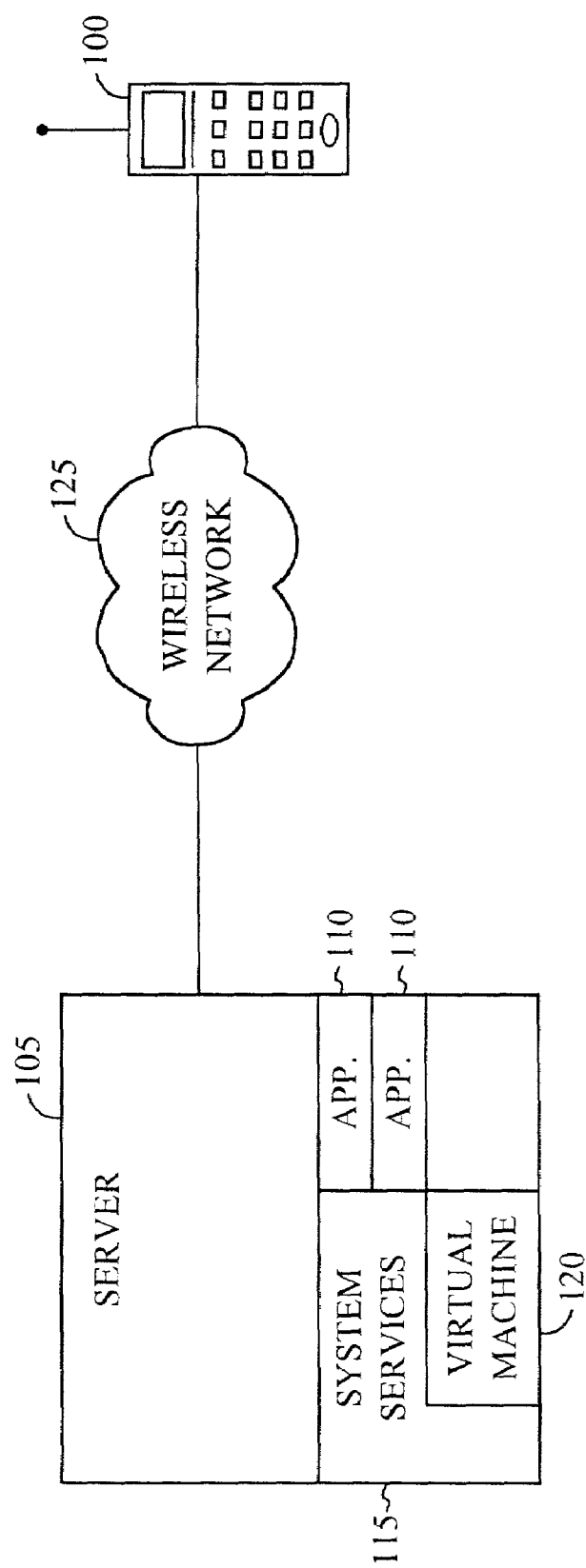
FIG. 1 depicts one exemplary embodiment of the environment in which the present invention may be practiced.

FIG. 1 depicts one exemplary embodiment of the environment in which the present invention may be practiced. In this embodiment, the device 100 communicates with the server 105 using a wireless network 125. The device 100 may be a wireless device that may transmit and/or receive data and/or voice. The wireless device 100 may request various pieces of information from the server, including applications 110 and system services 115, such as a virtual machine 120, used by the wireless device.

The wireless device 110 may contain a processor and memory, primary and secondary, (not shown) used to store, load and execute the applications 110 and system services 115 downloaded from the server. These applications 110 and system services 115 may also interact with a software platform located on the wireless device used to simplify interfacing with the wireless device, such as by providing generalized calls for device specific resources. Such a software platform is the Binary Runtime Environment for Wireless™ (BREW™) software developed by QUALCOMM, Inc., San Diego, Calif.

It will be recognized by those skilled in the art that the wireless device's 100 architecture may also contain an assortment of other components (either not shown or specifically indicated).

Such components include, but are not limited to: a display, speaker, microphone, and buttons allowing alphanumeric and symbol inputs. The wireless device may also contain a battery, multiple storage mechanisms, such as ROMs, RAMs, and flash memory, an operating system and a compilation component to aid in the execution of applications, system services, other executable code and manipulation of data, on the device.

While the system services and applications are depicted as being located on the server 105, it will be recognized by those skilled in the art that the applications and software may not be physically located at the server. In this case, the server may make a request for the applications and system services for the wireless device from other systems and then download the requested files or may transfer the request to another system for direct transfer of requested files to the wireless device.

As is recognized by those skilled in the art, FIG. 1 is one exemplary environment for the present invention. The device may include other types of systems, including wireless and non-wireless devices. In addition, the device may communicate with the server and other systems by a multiple of network types and communication architectures, including wireless and non-wireless, private and public, switched and non-switched, direct links, and any combination thereof.

Figure 2:
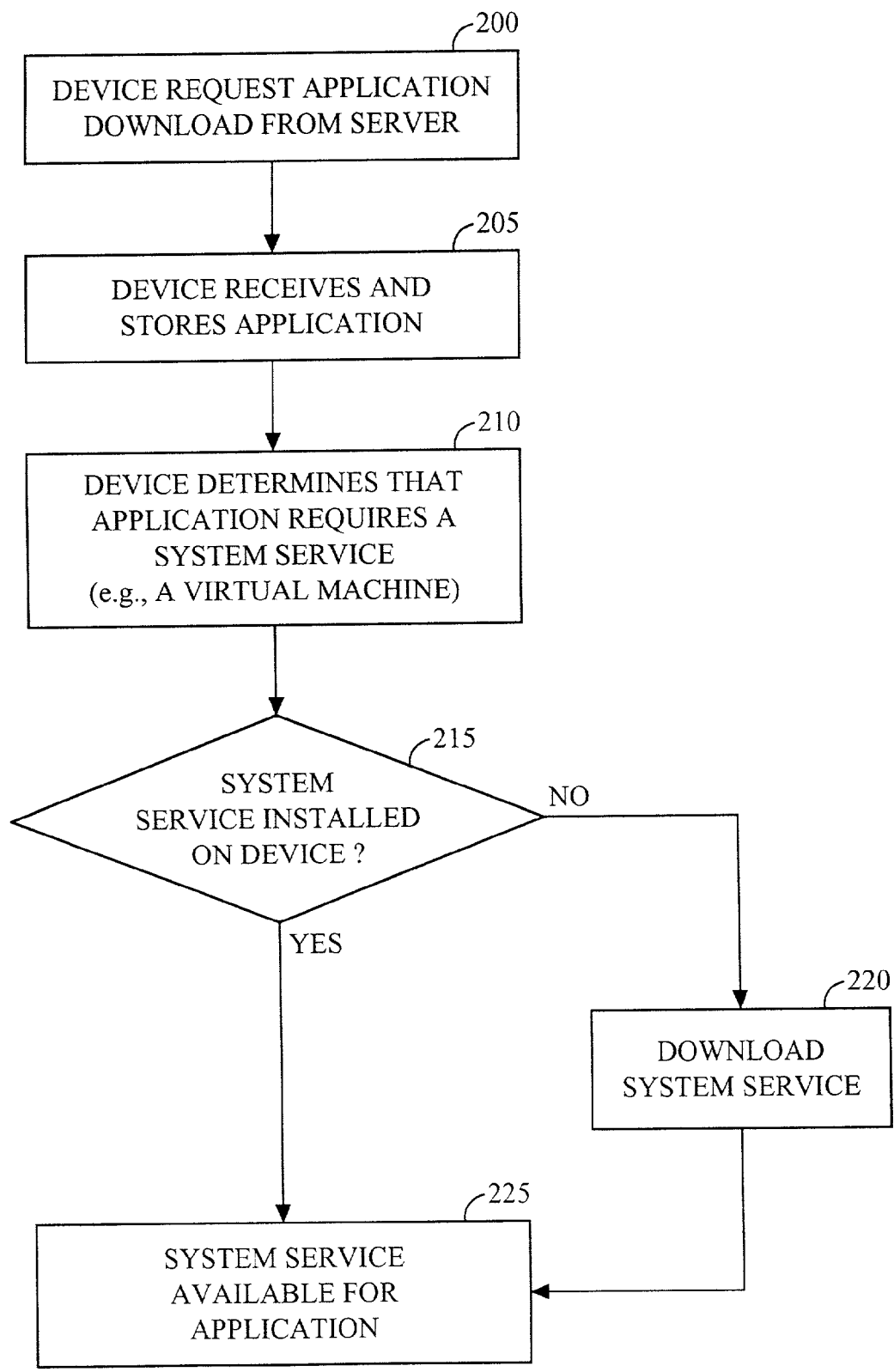
FIG. 2 depicts the process involved with downloading an application which uses a system service consistent with an exemplary embodiment of the present invention.

FIG. 2 depicts the process involved with downloading an application which uses a system service consistent with an exemplary embodiment of the present invention. A device, such as the wireless device 100, requests an application from the server 105 (Step 200). This request may have been initiated because a user requests a specific application, such as a game, from the wireless device. The device may be configured such that the applications available to the user are not all resident on the device itself, but a representation of those applications that the user may access.

This request, however, may be non-user initiated and may include those tasks for system maintenance and for tasks not involving direct user interaction. In addition, the request may be for types of files other than applications, including data, system services, or other types of information.

The device then receives the application from the server and stores it (Step 205). In one embodiment, the server sends the requested application to the device. As stated above, however, the application may not be physically stored at the server; yet, the server may receive the request and initiate the application download to the device.

The device then checks the application to determine whether the application uses a system service (Step 210). The application may include a reference, or some identifier, indicating that a systems service is used with the application. This reference may be included with the application or associated with the application in some other manner.

In one embodiment, the application is a Java applet and requires the use of a Java virtual machine (a system service) to execute. The device may contain a software platform, such as Brew™, described above. The device, using the software platform, determines that a Java virtual machine is used by the applet by checking whether there are any references by the applet to an object class indicating a Java virtual machine. In one embodiment, each object class is represented by a unique 32-bit identifier and this identifier can be used to determine which object classes are referenced.

The device then determines if the system service is already installed on the device (Step 215). In one embodiment, this is performed by checking the internal tables listing the object classes installed on the device. Using the 32-bit identifier referenced by the downloaded application, the internal tables are checked to determine if the referenced object class is installed, or using the above example, whether the Java virtual machine is already installed on the device.

If the system service is not installed, then the "no" branch is followed and the system proceeds to download the system service (Step 220). Following the above example, if the Java virtual machine used by the downloaded application is not installed in the device, then the device makes a request to the server to download the Java virtual machine. Additionally, if other system services are needed, they may also be downloaded to the device.

It will be recognized by those skilled in the art that the downloading of system service(s) used by the downloaded application can be performed without any action by the user. Other than some possible transmission delays or indications, the user may be completely unaware that these downloads are occurring. It may, however, be desirable to inform the user that additional downloads are taking place. This is an implementation preference left to those practicing the present invention.

It will be further recognized by those skilled in the art that the downloading of a system service may be independent of whether the application was downloaded or not (i.e., the downloading of the system service may be initiated because of applications installed at the factory or otherwise transferred onto the device).

If the system service is already installed in Step 210 or after it is downloaded in Step 220, then the system service is available for when the application is executed. It will be recognized by those skilled in the art that the system service may be downloaded onto the device but not loaded in the device for execution.

While the above description incorporates the use of the device making the determination of whether the system services are needed and downloading the system service in response to a request from the device, the invention also embodies the process where the server, or other system, performs the determination as to whether system services are needed and downloads the system service based on whether the device already has the system service installed or not.

Figure 3:
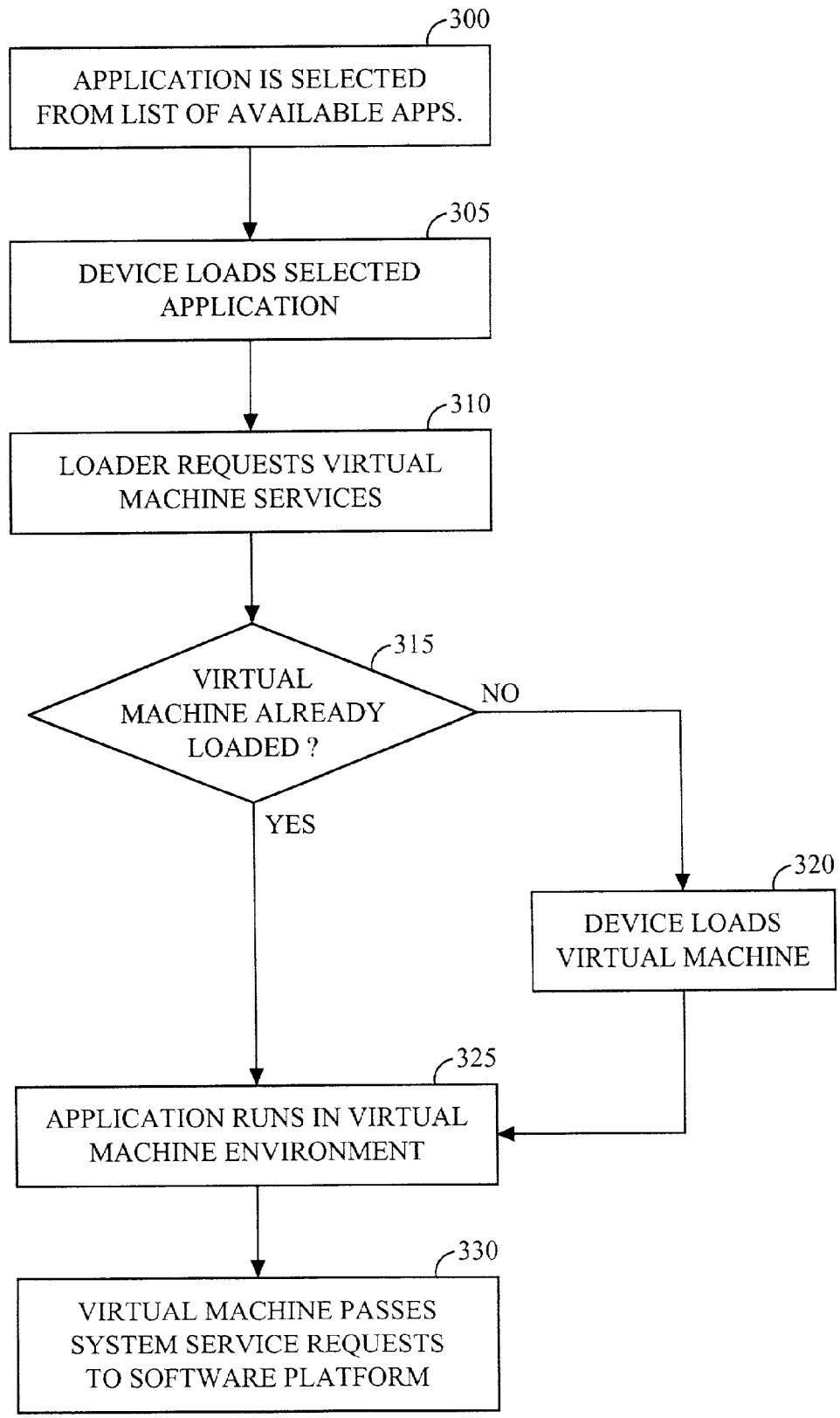
FIG. 3 depicts the process of loading and executing a virtual machine installed on the wireless device in response to loading an application, which uses the virtual machine.

FIG. 3 depicts the process of loading and executing a virtual machine installed on the wireless device in response to loading an application which uses the virtual machine. The process begins by having an application selected from those applications available to the wireless device (Step 300). This selection may be performed by a user wishing to execute the application. The selection, however, may be performed without user intervention by the device or in some other automated manner.

After the application is selected, the device loads the application into memory (Step 305) for execution. (Depending on the environment in which the application is executing, the loading of the application may be considered part of the application's execution). During this loading phase, the loader (the component loading the application for execution) requests the virtual machine services (Step 310). In one embodiment, the loader may perform this using an Applications Programming Interface (API) mechanism built in the software platform, described above, identifying the virtual machine using a unique class identifier.

For example, the application may be a Java applet requiring the use of a Java virtual machine to execute on the wireless device. A loader loading the Java applet on the device for execution may request Java virtual machine services by using a Brew™ API mechanism identifying the Java virtual machine by a unique identifier. In one embodiment, this identifier is a 32 bit class identifier.

The device then determines whether the virtual machine system service is loaded into memory (Step 315). The device may do this by checking the object classes loaded into memory. It is preferable that an identifier associated with each object class be used in order to track those system services, applications, executable files, data, other data types or object classes that are loaded.

The device, or specifically in one embodiment the Brew software platform, makes the determination as to whether the virtual machine requested by the loader is in memory already.

If the virtual machine is not already loaded into memory as determined in Step 315, the "no" branch is followed and the device loads the virtual machine (Step 320). If the virtual machine is not already installed on the wireless device, the virtual machine may be downloaded onto the wireless device from an external source, such as a server or other computer system which has access to the virtual machine software.

Depending on the device and operating platform the present invention is implemented on as well as the system service, the system service may require an additional execution or start step following its loading. The system service, or virtual machine in this embodiment, should be in a state in the device that is accessible to the downloaded application when executed or possibly other processes.

Following step 320 or if the determination is made after Step 315 that the virtual machine is already loaded, the application then runs in the virtual machine environment (Step 325). If the system service is not a virtual machine, the application can now use the system service downloaded for the application. In the Java virtual machine example, the Java applet executes in the Java virtual machine environment.

If the device contains a software platform, such as the Brew™ software, to simplify the interface from the application to the wireless device, the virtual machine passes system services' requests made by the application or the virtual machine to the software platform (Step 330).

It will be recognized that while FIG. 3 discusses an application using a virtual machine during execution, that this is for exemplary purposes and the dynamic loading of other system services, other than the virtual machine, other executable content, and data used with applications, are considered within the scope of the present invention.

CONCLUSION

The present invention allows for the dynamic download and execution of system services on a device. In one embodiment, an applet requiring a virtual machine is downloaded to a wireless device. A software platform on the device determines that a virtual machine is used by the applet during execution. Without additional user interaction, the virtual machine is downloaded to the wireless device. This allows those applets requiring a virtual machine to be used with devices that don't have the virtual machine already installed.

Another embodiment of the present invention allows the dynamic loading of a system service, such as a virtual machine, when an application is being loaded that uses the system service. In this embodiment, it is performed using a unique identifier associated with the system service that allows the device to determine if the system service is loaded.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but one embodiment of the present invention may be implemented as a combination of hardware and software or in hardware alone. The invention may be implemented with both object-oriented and non-object-oriented programming systems. Additionally, although aspects of the present invention are described as being stored in memory, those skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

The invention claimed is:

1. A method for supporting a download of an application from a server to a wireless device, comprising:

downloading from the server the application and an associated reference;

first determining, prior to execution of the application, based upon the associated reference, whether execution of the application requires a virtual machine to be loaded on the wireless device;

if said first determining step determines that the virtual machine is required for the execution of the application, performing the step of second determining whether the virtual machine is loaded on the wireless device;

if said second determining step determines that the virtual machine is not loaded on the wireless device, sending a second download request to the server for the virtual machine, and making the virtual machine available to the application after the virtual machine has been received from the server in response to the second download request;

wherein said steps of first determining, second determining, sending a second download request, and making the virtual machine available are performed automatically on the wireless device without interaction with a user of the wireless device.

2. The method of claim 1, wherein the application is Java code and the virtual machine is a Java virtual machine.

3. A wireless device readable medium including instructions stored thereon that when executed by a processor of a wireless device, causes the wireless device to perform operations, the instructions comprising:

instructions to download from a server an application and an associated reference;

instructions to first determine, prior to execution of the application, based upon the associated reference, whether an execution of the application requires a virtual machine to be loaded on the wireless device;

if said first determining step determines that the virtual machine is required for execution of the application, performing the step of second determining whether the virtual machine is loaded on the wireless device;

instructions to automatically download from the server the virtual machine, and making the virtual machine available to the application when it is determined the application requires the virtual machine.

4. A wireless device, comprising:

means for downloading an application and an associated reference;

first means for automatically determining, prior to execution of the application and without interaction with a user of the wireless device, based upon the associated reference, whether execution of the application requires a virtual machine to be loaded on the wireless device;

second means for automatically determining without interaction with the user of the wireless device whether the virtual machine is loaded on the wireless device when said first means for determining has determined that the application requires a virtual machine; and means for automatically sending without interaction with the user of the wireless device, a second download request for the virtual machine when said second means for determining has determined that the virtual machine is not loaded on the wireless device.

* * * * *